March 27, 1956
O. LUX
2,739,492
BICYCLE SHIFT UNIT
Filed Feb. 7, 1955
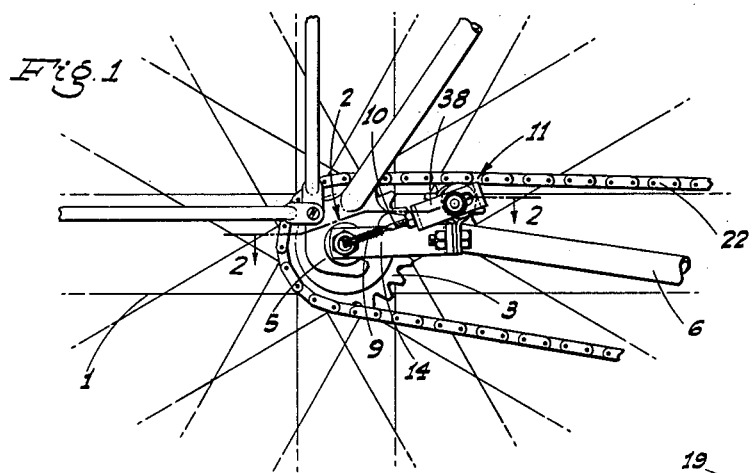
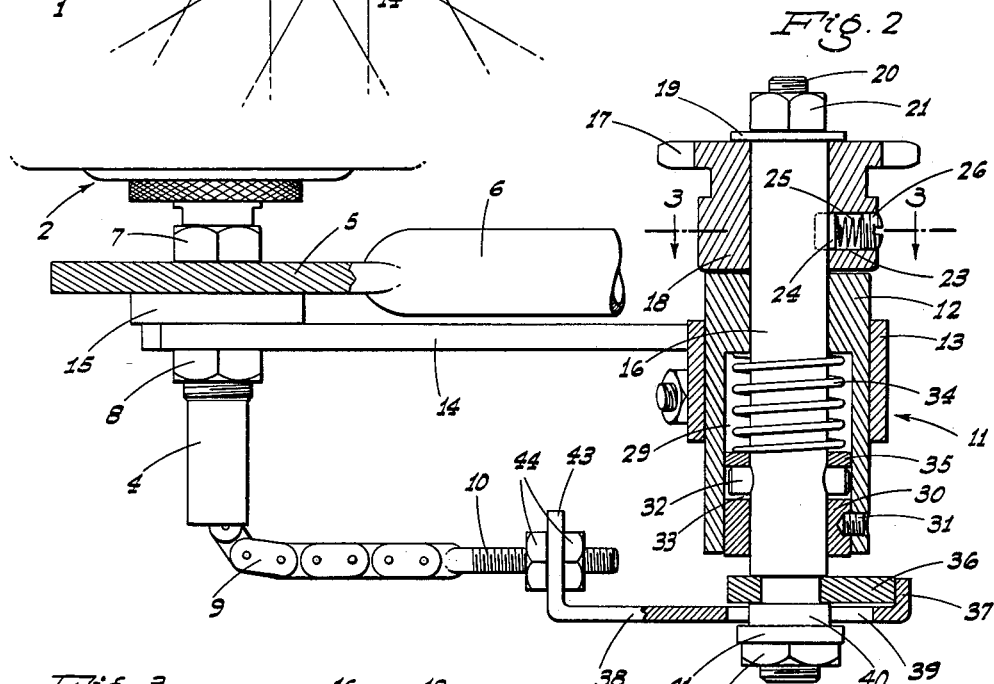
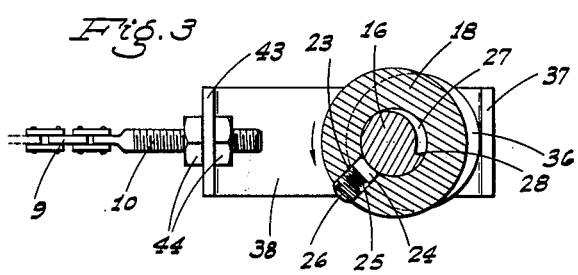
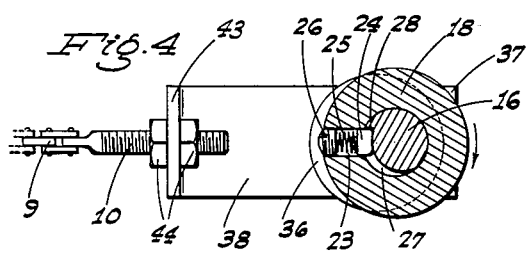
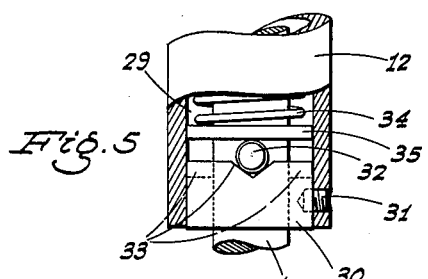
INVENTOR
Oscar Lux
BY Webster & Webster
ATTYS.

United States Patent Office 2,739,492
Patented Mar. 27, 1956

2,739,492

BICYCLE SHIFT UNIT

Oscar Lux, Sacramento, Calif.

Application February 7, 1955, Serial No. 486,451

10 Claims. (Cl. 74—475)

This invention relates in general to an attachment for bicycles of the type which include a shiftable, change-speed device incorporated in the rear wheel hub. A conventional type of such shiftable, change-speed device includes a flexible pull element which runs out of, and turns forwardly from, a tubular spindle; said element being pulled—different distances selectively—to accomplish speed changes. In the conventional arrangement the flexible pull element is actuated by a guided cable connected to said element and thence leading to a manually operated hand lever on one of the handle bars of the bicycle.

A major object of the present invention is to provide, as a bicycle attachment, a shift unit which is operative to effect shifting of a change-speed device, as above, but without the use of the hands; the shift unit being actuated in its entirety from the bicycle drive chain.

Another important object of this invention is to provide a novel shift unit—for so pulling said flexible element of the shiftable change-speed device—which is actuated from the bicycle drive chain upon reverse travel thereof caused by the cyclist back pedaling.

An additional object of the invention is to provide a shift unit, for the purpose described, which is designed for ease and economy of manufacture and ready mounting on a bicycle which includes a shiftable, change-speed device of the type described.

Still another object of the invention is to provide a practical, reliable, and durable bicycle shift unit, and one which will be exceedingly effective for the purpose for which it is designed.

These objects are accomplished by means of such structure and relative arrangement of parts as will fully appear by a perusal of the following specification and claims.

In the drawings:

Fig. 1 is a fragmentary side elevation of the rear portion of a bicycle embodying a shiftable, change-speed device arranged in connection with the shift unit; the bicycle frame and the rear wheel being shown only in part.

Fig. 2 is an enlarged sectional plan view on line 2—2 of Fig. 1.

Fig. 3 is a fragmentary transverse sectional elevation taken on line 3—3 of Fig. 2 and looking in the direction of the arrows; such view illustrating the clutch over-running when the bicycle is being pedaled forwardly.

Fig. 4 is a similar view, but shows the clutch as locked or engaged when the bicycle is back pedaled to place the shift unit in operation.

Fig. 5 is a fragmentary plan view, partly in section, showing the transverse shaft and the cross pin, of the shift unit, turned 90° from the positions occupied by said parts in Fig. 2.

Referring now more particularly to the drawings, and to the characters of reference marked thereon, the novel shift unit is adapted for embodiment in a bicycle which includes a rear wheel, indicated in part at 1, fitted with a multiple-speed rear hub unit, indicated generally at 2; such hub unit having the usual rear drive sprocket 3 in assembly therewith.

The multiple-speed rear hub unit 2 includes a tubular spindle 4 which projects axially outwardly from one end thereof through the flat mounting bracket 5 included on the rear end of one lower side bar 6 at the rear of the bicycle frame. The mounting bracket 5 is clamped, together with other parts hereinafter described, between nuts 7 and 8 on said spindle 4.

The multiple-speed rear hub unit 2 is adapted to be shifted from one speed setting to another—of which there are usually three—by means of a pull chain which extends out of the tubular spindle 4 at its free end, thence turning and extending forwardly. The pull chain 9, which is always under return tension, is formed—at its forward end—with a threaded stud 10. By pulling the chain 9 forwardly different distances the rear hub unit 2 is set for different bicycle speeds.

Heretofore it has been the practice to pull the chain 9 by means of a guided cable which ran forwardly to a hand lever on one of the handle bars of the bicycle. The present invention eliminates the use of such guided cable and hand lever, and in lieu thereof I provide a chain-actuated shift unit, indicated generally at 11.

Such shift unit 11 is constructed and functions in the following manner:

A relatively short, cylindrical body 12 is disposed horizontally and transversely above the side bar 6 adjacent but ahead of the rear end of the latter; such body being rigidly supported in a clamping collar 13 carried on the forward end of an arm 14 which extends rearwardly to a point laterally out from but alongside the bracket 5. The tubular spindle 4 extends through the arm 14, and—with said bracket 5—is clamped between the nuts 7 and 8; there being a spacing washer 15 between such bracket and the nut 8.

A horizontal, transversely extending shaft 16 is journaled in the body 12 and projects beyond both ends thereof. A separate sprocket 17 is journaled on the projecting inner end portion of the shaft 16 by means of a hub 18 included with said sprocket 17; the hub being located between the inner end of the body 12 and a washer 19 which surrounds a threaded stud 20 extending from the inner end of the shaft 16 and having a nut 21 thereon.

The separate sprocket 17 as so mounted is in mesh with the upper run of the bicycle drive chain 22, which run normally travels forwardly.

An over-running -type clutch is formed between the hub 18 and shaft 16, comprising the following:

The hub 18 is formed with a radial bore 23 in which a plunger 24 is slidable; such plunger being urged inwardly by a compression spring 25 in bore 23 between the plunger 4 and a plug 26 threaded into the outer end of said bore.

In the circumferential plane of the bore 23 and plunger 24 the face of the shaft 16 is formed with a part-circle eccentric groove 27 which defines, at one end, a radial shoulder 28. The radial shoulder 28 faces in the same direction as the hub 18 rotates under the influence of forward travel of the upper run of the drive chain 22. With this arrangement of the clutch it normally over-runs; i. e., the plunger 24 recurrently falls into the groove 27 adjacent the shoulder 28, but without obstruction against continued rotation about said shaft 16.

However, when the upper run of the drive chain 22 travels rearwardly, caused by back pedaling of the bicycle, the sprocket 17 is reversed and the plunger 24—after no more than a full revolution—comes to rest against the radial shoulder 28. This locks the shaft 16 to the hub 18 for rotation in common in the direction caused by such rearward travel of said upper run of the drive chain 22.

Thus, when the bicycle is being pedaled forwardly the above described clutch over-runs and the sprocket 17 and hub 18 turn in the direction indicated by the arrow in Fig. 3 without any rotation being imparted to the shaft 16.

However, upon back pedaling of the bicycle the upper run of the drive chain 22 travels rearwardly, and said sprocket 17 and hub 18 reverse in their direction of rotation, as indicated by the arrow in Fig. 4, whence the clutch locks and causes the shaft 16 to rotate with said sprocket and hub. The purpose of this clutching arrangement will hereinafter appear.

The cylindrical body 12 is formed with a bore 29 which opens to the end of said body opposite the separate sprocket 17; such end of the body being fitted with a bushing 30 through which the shaft 16 extends; the bushing 30 being held in place by a set screw 31.

A cross pin 32, with oppositely projecting ends, is mounted in the shaft 16 in a position to be normally disposed with the projecting ends of said cross pin resting in opposed ones of inwardly facing, wide angle V-notches 33 formed in the inner end of bushing 30, 90° apart. The projecting ends of the cross pin 32 are normally maintained in certain opposed ones of the notches 33 by a compression spring 34 which surrounds the shaft 16 between the bottom of bore 29 and a washer 35 on said shaft between such spring and the projecting ends of the cross pin 32. With this arrangement—which is in effect a yieldable spring-pressed detent—it will be recognized that such projecting ends of the cross pin 32 are normally maintained in opposed ones of the notches 33, as aforesaid, but upon sufficient rotative force being applied to the shaft 16 such projecting ends of the cross pin 32 will ride out of the notches to subsequently fall into other opposed ones thereof.

At the projecting end portion opposite the separate sprocket 17 the transverse shaft 16 is fitted, adjacent but short of its extreme outer end, with a rotary eccentric cam 36 which works, at its periphery, against an inturned ear 37 on the forward end of a pull arm 38; such pull arm being formed adjacent but short of the ear 37 with an elongated longitudinal slot 39 through which the related portion of the shaft 16 projects.

Within said slot 39 the shaft 16 is fitted with a collar 40 which rides in said slot and maintains the pull arm 38 in a supported position but for to and fro sliding motion. The collar 40 is retained in place by a washer 41 against which abuts an outer end nut 42 threaded on the adjacent free end of the shaft 16.

The pull arm 38 extends rearwardly at a downward incline some distance from the rotary eccentric cam 36, and at its inner end said arm is formed with an inturned ear 43 through which the stud 10 projects; such stud being fixed to ear 43 by opposed nuts 44 engaging opposite sides of said ear.

When it is desired to effect a speed change, through the medium of the rear hub unit 2, the cyclist merely back pedals, with the result that the hub 18 of separate sprocket 17 is locked to the shaft 16, as hereinbefore described. When this occurs, a slight continuance of the back pedaling will accomplish rotation of the transverse shaft 16 and the rotary eccentric cam 36; the latter—working against the ear 37—imparting a pull to the arm 38 and chain 9, which accomplishes the desired speed change.

As the longitudinal movement of the pull arm 38 under the influence of the eccentric cam 36 is dependent upon the degree of rotation of the latter, the cyclist can readily —and by back pedaling alone—accomplish a pull on chain 9 to different extents, and by means of which the different speed changes can be selectively attained.

During this operation, and with rotation of the shaft 16, the projecting end portions of the cross pin 32 successively yield from certain of the opposed notches 33 and snap-engages in others, which produces—with each 90° of turning—a clicking sound. Each such clicking sound indicates to the cyclist that a speed change has been accomplished.

After each speed change the projecting ends of the cross pin 32, resting in notches 33, releasably hold the shaft 16 against turning and maintain the mechanism of the multiple speed rear hub unit 2 in a selected speed setting.

With the described arrangement, a multiple-speed rear hub unit 2 of a bicycle can be readily, positively, and effectively controlled, with the selective speed settings accomplished solely by back pedaling of the bicycle and without the necessity of any hand manipulation of a lever or the like.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A shift unit for a bicycle which includes a rear hub and sprocket assembly embodying a change-speed device including a sprocket and having a movable control element, a frame supporting said assembly, and a reversible drive chain trained about and extending forwardly from the sprocket of said assembly; said shift unit being disposed ahead of the movable element, supported in connection with the frame, and including an actuating member connected to and operative to move said control element, a sprocket in mesh with the chain, and mechanism between the sprocket and member arranged to actuate the latter only upon reverse movement of said chain.

2. A shift unit, as in claim 1, including a yieldable spring-pressed detent arranged to releasably maintain said member in a selective position.

3. A shift unit for a bicycle which includes a rear hub and sprocket assembly embodying a change-speed device including a sprocket and having a movable control element, a frame supporting said assembly, and a reversible drive chain trained about and extending forwardly from the sprocket of said assembly; said shift unit comprising a support disposed ahead of said movable control element, means mounting the support in connection with the frame, a transverse shaft journaled on the support, a separate sprocket journaled on the shaft and meshing with the chain, a clutch between said separate sprocket and shaft, the clutch being arranged to over-run when the chain is traveling in a bicycle advancing direction but operative to engage said separate sprocket with the shaft upon reverse travel of the chain whereby to then rotate the shaft in a predetermined direction, and means between the shaft and said control element operative to move the latter upon such rotation of said shaft.

4. A shift unit, as in claim 3, including a yieldable spring-pressed detent between the shaft and support operative to releasably maintain said shaft in at least one predetermined rotative position.

5. A shift unit, as in claim 4, in which said spring-pressed detent is arranged to releasably and selectively maintain the shaft in a plurality of rotative positions; said control element being movable different distances for related speed changes and being moved such different distances upon rotation of the shaft to corresponding rotative positions.

6. A shift unit for a bicycle which includes a rear hub and sprocket assembly embodying a change-speed device including a sprocket and having a movable control element, a frame supporting said assembly, and a reversible drive chain trained about and extending forwardly from the sprocket of said assembly; said shift unit comprising a body disposed ahead of said movable control element, means mounting the body in connection with the frame, the body having a transverse bore therein, a shaft journaled in the bore and projecting at the ends therefrom, a separate sprocket journaled on one end of the shaft and being in mesh with the chain, a clutch between said separate sprocket and shaft, said clutch being operative to engage the separate sprocket with the shaft only upon reverse movement of the chain, and mechanism between the other end of the shaft and said control element operative to move the latter upon rotation of the shaft.

7. A shift unit, as in claim 6, in which said mechanism includes a shiftable member, and a cam on the shaft operative to shift said member upon rotation of said shaft.

8. A shift unit for a bicycle which includes a rear hub and sprocket assembly embodying a change-speed device including a sprocket and having a movable control element, a frame supporting said assembly, and a reversible drive chain trained about and extending forwardly from the sprocket of said assembly; said shift unit comprising a body disposed ahead of said movable control element, means mounting the body in connection with the frame, the body having a transverse bore therein, a shaft journaled in the bore and projecting at the ends therefrom, a separate sprocket journaled on one end of the shaft and being in mesh with the chain, a clutch between said separate sprocket and shaft, said clutch being operative to engage the separate sprocket with the shaft only upon reverse movement of the chain, a yieldable spring-pressed detent between the body and shaft adapted to releasably maintain the latter in selective positions of rotative adjustment, and mechanism between the other end of the shaft and said control element operative to move the latter different distances corresponding to certain of said selective positions of rotative adjustment.

9. A shift unit for a bicycle which includes a rear hub and sprocket assembly embodying a change-speed device including a sprocket and having a movable control element, a frame supporting said assembly, and a reversible drive chain trained about and extending forwardly from the sprocket of said assembly; said shift unit comprising a body disposed ahead of said movable control element, means mounting the body in connection with the frame, the body having a transverse bore therein, a shaft journaled in the bore and projecting at the ends therefrom, a separate sprocket journaled on one end of the shaft and being in mesh with the chain, a clutch between said separate sprocket and shaft, said clutch being operative to engage the separate sprocket with the shaft only upon reverse movement of the chain, the bore in the body being enlarged for a distance axially inwardly from the end opposite said separate sprocket, a bushing about the shaft and secured in the open end of said enlarged portion of the bore, the inner end of the bushing being radially notched at circumferentially spaced points, a cross pin on the shaft in said enlarged portion of the bore, the cross pin including a projecting end normally seated in one of said notches, a washer on the shaft inwardly of but resting against said projecting end of the corresponding pin, a compression spring about the shaft between the bottom of said enlarged portion of the bore and said washer, and mechanism between the end of the shaft beyond said bushing and said control element operative to move the latter different distances upon rotation of said shaft to dispose the projecting end of the cross pin in different notches.

10. A shift unit for a bicycle which includes a rear hub and sprocket assembly embodying a change-speed device including a sprocket and having a movable control element, a frame supporting said assembly, and a reversible drive chain trained about and extending forwardly from the sprocket of said assembly; said shift unit comprising a body disposed ahead of said movable control element, means mounting the body in connection with the frame, the body having a transverse bore therein, a shaft journaled in the bore and projecting at the ends therefrom, a separate sprocket journaled on one end of the shaft and being in mesh with the chain, a clutch between said separate sprocket and shaft, said clutch being operative to engage the separate sprocket with the shaft only upon reverse movement of the chain, an eccentric cam secured on the other end of the shaft, an adjacent longitudinal movable arm having a follower riding said cam, means guiding said arm for longitudinal motion by the cam, the control element being longitudinally movable, and a connection between said arm and control element.

No references cited.